United States Patent [19]

Witner et al.

[11] 4,000,166
[45] Dec. 28, 1976

[54] ADDITION OF SILICONE GUM RUBBER TO PHOSPHONITRILIC FLUOROELASTOMERS TO IMPROVE MILL PROCESSING LOW TEMPERATURE FLEXIBILITY AND VOLUME SWELL IN LOW AROMATIC CONTENT FLUIDS

[75] Inventors: Joseph F. Witner, Cuyahoga Falls; Gary S. Kyker, Uniontown, both of Ohio

[73] Assignee: The Firestone Tire & Rubber Company, Akron, Ohio

[22] Filed: Apr. 7, 1975

[21] Appl. No.: 565,515

[52] U.S. Cl. .................. 260/37 SB; 260/824 R
[51] Int. Cl.[2] ................................ C08L 43/04

[58] Field of Search .................. 260/37 SB, 824 R

[56] References Cited
UNITED STATES PATENTS 3,326,852   6/1967   Thomas .................. 260/824 R

*Primary Examiner*—James H. Derrington

[57] ABSTRACT

Improvements in mill processing, low temperature flexibility and volume swell in fluids with low aromatic contents result from the addition of silicone gum rubbers to phosphonitrilic fluoroelastomers.

6 Claims, No Drawings

ADDITION OF SILICONE GUM RUBBER TO PHOSPHONITRILIC FLUOROELASTOMERS TO IMPROVE MILL PROCESSING LOW TEMPERATURE FLEXIBILITY AND VOLUME SWELL IN LOW AROMATIC CONTENT FLUIDS

This invention relates to the addition of silicone gum rubbers to phosphonitrilic fluoeoelstomers in amounts which result in improvements in mill processing, low temperature flexibility and volume swell in fluids with low aromatic contents.

A new and useful group of polyphosphazene terpolymers are described in U.S. Pat. No. 3,700,629 issued Oct. 24, 1972, and in a presently pending U.S. Pat. Application Ser. No. 405,236, filed Oct. 10, 1973, the disclosures of which are intended to be incorporated herein by this reference.

These terpolymers consist of a linear or branched chain of alternating N and P atoms, which substituents on the P atoms including at least two different fluoroalkoxy groups (the groups $-OCH_2CF_3$ and $-OCH_2(CF_2)_3CF_2H$ being particularly preferred), and a third substituent containing some unsaturation, e.g., an alkenyl substituted phenoxy group, o-alloylphenoxy (OAP) being a particularly preferred substituent, this being included in the terpolymer to provide a cure site.

Such polyphosphazenes exhibit a combination of chemical and physical properties which adapt them to uses as O-ring seals in environments in which they are placed in physical contact with temperatures well below 0° F, and as low as −50° F or even lower.

Further, in processing such known terpolymers, it has been found that they exhibit a tendency to stick to rubber processing equipment and are therefore hard to process, e.g. on rubber mills or calenders.

By the present invention, which conists of the incorporation of specified amounts of silicone gum rubbers into such polymers, the ability to work the polymers on rubber mills, and the ability to shape them by calendering or extrusion is found to be greatly enhanced. Further, it has been found that the resulting compositions possess improved low temperture flexibility and improved volume swell in low aromatic content fluids. When such terpolymers are utilized in the form of hoses, e.g., for the dispensing of gasoline or other fuel, swelling of the hose is undesirable. When such terpolymers are used as seals or "o" rings exposed to contact with fuels or lubricants which cause the seals to swell excessively, binding may occur in moving parts, although some swelling may be advantageous. The solvent resistance of such terpolymers is outstanding. They are therefore useful in fuel hoses and seals.

One object of this invention is to improve the low temperature flexibility and to increase slightly the volume swell in petroleum based hydraulic fluids of such phosphazene terpolymers.

Another object of the invention is to enchance the processability of phosphazene terpolymers on mills, calenders and extruders.

These and other objects are achieved by the incorporation of silicone gum in compositions based on such polyphosphazenes.

The invention will be further understood from the Examples which follow, describing preferred embodiments of the invention. Table I sets forth results obtained with compositions formulated as follows:

To 100 parts by weight of phosphazene terpolymer $[(CF_3CH_2O)(HF_2C(CF_2)_3-CH_2O)\ (U)P=N]_n$, (U =cure site) there were added 30 parts by weight of fumed silica (filler) and 6.0 parts by weight of MgO. This masterbatch was mixed in a Brabender mixer to achieve a uniform mixture. Then 1 part by weight of a stabilizer Bis(8-hydroxyquinoline) Zinc (II) and either 1 to 1.5 parts by weight of 40% dicumyl peroxide on calcium carbonate were added to the masterbatch. Thereafter the amounts of silicone gum rubber set forth in Table I were added.

In mixing the mill batches the Silastic 410 was used to coat the mill rolls to prevent sticking and then the rest of the ingredients were added to the mill. The mill processing results were evaluated as shown in Table I.

After curing the resulting composition for 30 minutes at 320° F and post curing at 212° F for 24 hours the physical properties of the vulcanizates were measured with the results shown in Table I.

TABLE I

Silastic 410 in Silanox 101 Reinforced PNF* Vulcanizates

| | Brabender Mix (Masterbatch) | | | | |
|---|---|---|---|---|---|
| Polymer | 100 | 100 | 100 | 100 | 100 |
| Silanox 101 (Fumed Silica) | 30 | 30 | 30 | 30 | 30 |
| Stan Mag ELC (MgO) | 6 | 6 | 6 | 6 | 6 |
| | Mill Mix | | | | |
| Stabilizer | 1 | 1 | 1 | 1 | 1 |
| Dicup 40 C (Dicumyl Peroxide) | 1.5 | 1 | 1 | 1 | 1 |
| Dow Corning Sificone Gum 410 | — | 2 | 5 | 10 | 15 |
| | 134 | 140 | 143 | 148 | 153 |
| Mill Processing Results | Poor | Fair | Good | Good | Excellent |
| Normal Stress-Strain Cure 30' at 320° F Post Cure 24 hrs. at 212° F | | | | | |
| 50% Modulus, psi | 556 | 274 | 324 | 382 | 429 |
| 100% Modulus, psi | — | 542 | 629 | 753 | 845 |
| 200% Modulus, psi | — | 1444 | 1518 | — | — |
| Tensile Strength, psi | 1774 | 1814 | 1607 | 1381 | 1198 |
| % Elongation at Break | 100 | 245 | 215 | 180 | 145 |
| % Tension Set | 10 | 40 | 31 | 15 | 10 |
| Shore A Hardness(1) | 70 | 70 | 70 | 70 | 67 |
| % Compression Set(1) 70 hrs. at 275° F | 58 | 70.4 | 59.1 | 52.7 | 46.4 |

*PNF-Phosphonitrilic Fluoroelastomer $[(CF_3CH_2O)-(HF_2C(CF_2)_3CH_2O)(o\text{-allylphenoxy})P=N]_n$
(1)Same cure conditions as for stress-strain except 30' added to press cure.

Resistance to ASTM Fuels - A, B, and C (70 hrs. at 72° F)

| | | | | |
|---|---|---|---|---|
| ASTM Fuel A (Isooctane) | | | | |
| % Vol. Swell | 9.53 | 10.52 | 14.83 | 21.80 |
| % Wt. Change | 2.18 | 3.14 | 5.02 | 7.04 |
| % Extracted | 1.07 | 1.41 | 1.74 | 2.07 |
| ASTM Fuel B (Isooctane 70%/Toluene 30%) | | | | |
| % Vol. Swell | 14.89 | 16.56 | 20.94 | 26.26 |
| % Wt. Change | 3.99 | 6.81 | 7.48 | 9.65 |
| % Extracted | 3.00 | 2.95 | 3.09 | 3.46 |
| ASTM Fuel C (Isooctane 50%/Toluene 50%) | | | | |
| % Vol. Swell | 15.41 | 19.13 | 24.86 | 29.29 |
| % Wt. Change | 4.80 | 6.12 | 8.47 | 11.10 |
| % Extracted | 3.52 | 3.47 | 3.63 | 3.72 |

EXAMPLE 1

A base composition was prepared by blending the following in a Brabender mixer: 100 parts by weight of phosphonitrilic fluoroelastomer having $CF_3CH_2O$-, $HCF_2(CF_2)_3CH_2O$ and o-allylphenoxy groups on the P-N chain; 30 parts by weight of fumed silica and 6 parts by weight of MgO.

Into this blend there was mixed 1 phr of bis(8-hydroxyquinoline) Zinc II (see U.S. Pat. No. 3,867,341) and 1 phr of 40% dicumyl peroxide on calcium carbonate.

To the resulting composition, various amounts of a silicone gum rubber (Silastic 410) were added by coating the mill rolls with the same and then adding the composition. The processibility of the composition was evaluated as follows:

0 parts — poor; 2 parts — fair; 4, 5 and 10 parts — good; and 15 parts — excellent processibility.

EXAMPLE 2

Another silicone gum rubber (Silastic Gum 440) was used in place of the silicone gum rubber of Example 1. The results were similar except that the processibility of the mix with 10 parts of gum was improved from good to excellent. Silastic Gum 440 is a dimethyl siloxanepolymer containing vinyl and phenyl groups and it is described in Dow-Corning Corporation Bulletin No. 17–052, October, 1972.

EXAMPLE 3

A comparison of two identical blends except that one had 6 parts of silicone gum rubber added and the other had none gave the following results:

| Processing on 130° F Rubber Mill | Control | Contains 6 phr silicone gum |
|---|---|---|
| Mill Release | Fair (slightly sticky) | Excellent |
| Split to Both Rolls | No | No |
| Green Strength | Good | Good |
| Nerve (Surface Smoothness) | Good | Good |

EXAMPLE 4

When 30 parts of carbon black were used as a filler in place of the fumed silica, the results were as follows:

| Silastic 410 | None | 2 | 5 | 7.5 |
|---|---|---|---|---|
| Mill Processing | | | | |
| Green Strength | Poor | Fair | Excellent | Excellent |
| Mill Release | (Very Sticky) | (Slightly Sticky) | (No Sticking) | (No Sticking) |
| Split to Both Rolls | Yes | No | No | No |
| Surface Condition | Rough | Rough to Smooth | Smooth | Smooth |
| Comments | Poor Processing | Fair Processing | Excellent Processing | Excellent Processing |

EXAMPLE 5

Example 4 was repeated except that the gum was Silastic 430. The results were:

| Silastic 430 | 0 | 5 | 10 | 15 |
|---|---|---|---|---|
| Mill Processing | | | | |
| Green Strength | Poor | Good | Good | Good |
| Mill Release | Poor (Very Sticky) | Excellent | Excellent | Excellent |
| Split to Both Rolls | Yes | No | No | No |
| Surface Condition | Rough | Smooth | Smooth | Smooth |
| Comments | Poor Processing | Good Processing | Good Processing | Good Processing |

Silastic 430 is a dimethyl siloxane polymer containing vinyl groups and it is described in Dow-Corning Corporation Bulletin No. 09–0255, October, 1968.

Beneficial effects on procesing of phosphonitrilic fluoroelastomers were obtained with varying amounts of silicone gum rubbers over the range of from 1 to 20 parts of silicone gum rubber per 100 parts of phosphonitrilic fluoroelastomer. Mixtures of silicone gum rubbers were also found to give comparable benefits.

Silica reinforced (5 – 50 phr) phosphonitrilic fluoroelastomer compounds in general exhibit very poor mill processing. The addition of either carbon black (2 – 30 phr) or graphite (2 – 50 phr) alone or together along with silicone gum (1 – 20 phr) greatly improves the mill, calender and extruder processing of these compounds. These processing aids are not detrimental to other physical properties.

We claim:
1. A phosphonitrilic fluorelastomer composition possessing enhanced processibility, low temperature flexibility and slightly increased volume swell in petroleum based hydraulic fluids consisting essentially of:
    1. a fluoroelastomer consisting of alternating P and N atoms and the substituents attached to the P atoms are principally fluoroalkoxy groups and include at least some unsaturated groups; and
    2. between about 1 and 20 parts of silicone gum rubber per 100 parts of fluoroelastomer, blended therewith.
2. The composition of claim 1 including in addition a filler.
3. The composition of claim 2 wherein the filler is selected from the group consisting of:
    a. 5 to 50 parts of silica fillers per 100 parts of elastomer;
    b. 5 to 50 parts of silica fillers plus 2 to 30 parts of carbon black per 100 parts of elastomer; and c. 5 to 50 parts of silica fillers plus 2 to 50 parts of graphite per 100 parts of fluoroelastomer.

4. The composition of claim 1 wherein there are at least two different fluoroalkoxy groups in the elastomer.

5. The composition of claim 4 wherein the groups are $-OCH_2CF_3$ and $-OCH_2(CF_2)_3CF_2H$.

6. The process of enhancing the mill processing of phosphonitrilic fluoroelastomers which comprises incorporating from about 1 to 20 parts of silicone gum rubber in each 100 parts of said fluoroelastomer.

* * * * *